United States Patent
Wake et al.

(10) Patent No.: US 8,518,588 B2
(45) Date of Patent: Aug. 27, 2013

(54) FUEL CELL SYSTEM

(75) Inventors: Chihiro Wake, Wako (JP); Jumpei Ogawa, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 13/288,961

(22) Filed: Nov. 4, 2011

(65) Prior Publication Data
US 2012/0115055 A1 May 10, 2012

(30) Foreign Application Priority Data
Nov. 5, 2010 (JP) .................. 2010-248658

(51) Int. Cl.
*H01M 8/06* (2006.01)
*H01M 8/04* (2006.01)

(52) U.S. Cl.
USPC .......................... 429/414; 429/429

(58) Field of Classification Search
None
See application file for complete search history.

(56) References Cited

U.S. PATENT DOCUMENTS

| 8,450,016 B2 * | 5/2013 | Ogawa et al. ........... 429/414 |
| 2007/0015018 A1 * | 1/2007 | Tsutsui ................... 429/22 |
| 2008/0152987 A1 * | 6/2008 | Nakashima et al. ....... 429/34 |

FOREIGN PATENT DOCUMENTS

| JP | 2007-059221 | 3/2007 |
| JP | 2007-123040 | 5/2007 |

* cited by examiner

*Primary Examiner* — John S Maples
(74) *Attorney, Agent, or Firm* — Ditthavong Mori & Steiner, P.C.

(57) ABSTRACT

A fuel cell system includes a fuel cell, a circulation path, a water reservoir, a water level detector, a water discharger and a controller. The fuel cell generates electric power using fuel gas supplied to an anode and oxidant gas supplied to a cathode. Off-gas discharged from the fuel cell is returned to the fuel cell again through the circulation path. The water reservoir is disposed in the circulation path and stores water separated from the off-gas. During monitoring after stop of the fuel cell system or at startup of the fuel cell system, the controller operates the water discharger to discharge the water stored in the water reservoir when the controller determines that a level of the water detected or estimated by the water level detector is equal to or higher than a predetermined reference water level.

5 Claims, 11 Drawing Sheets

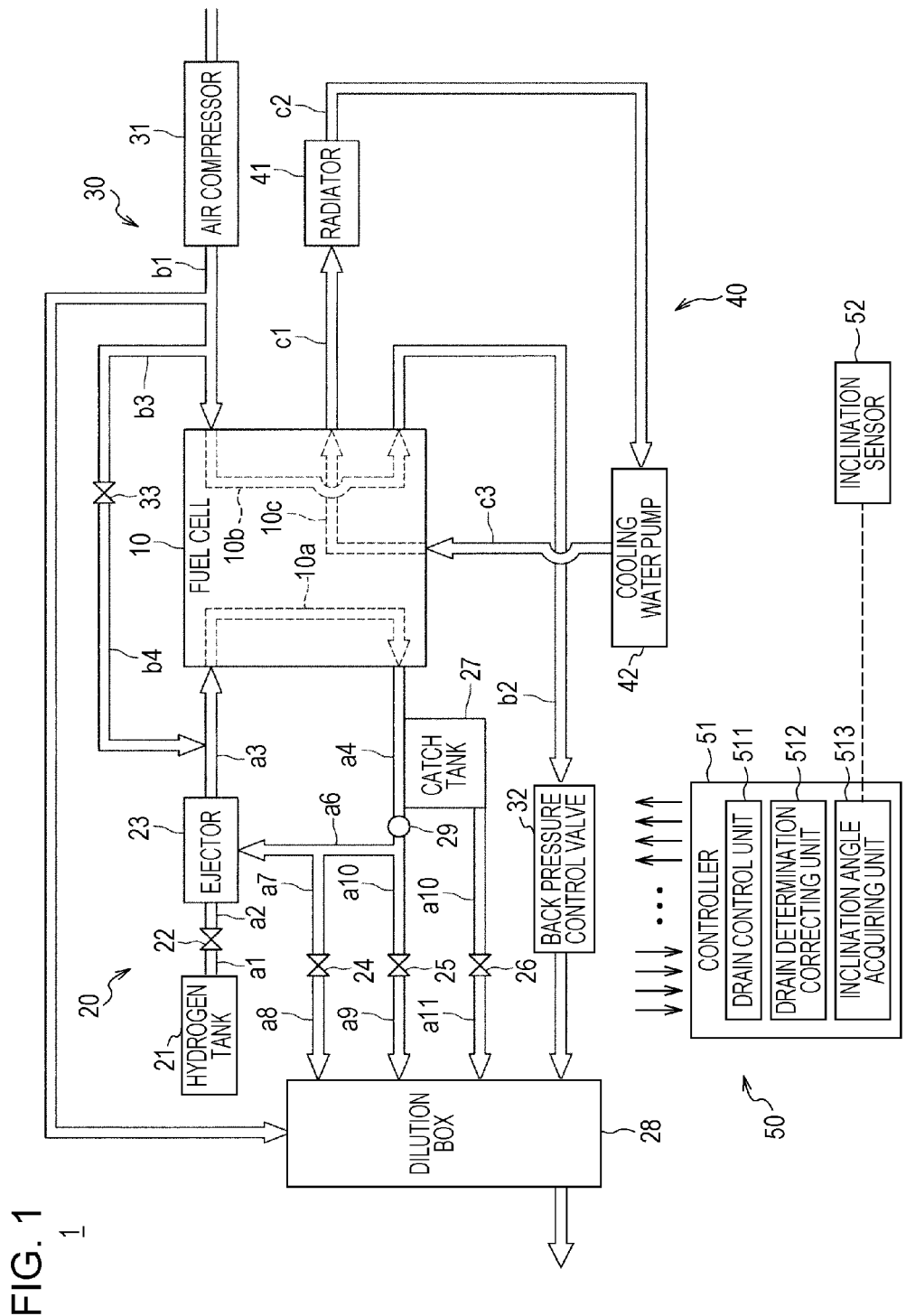

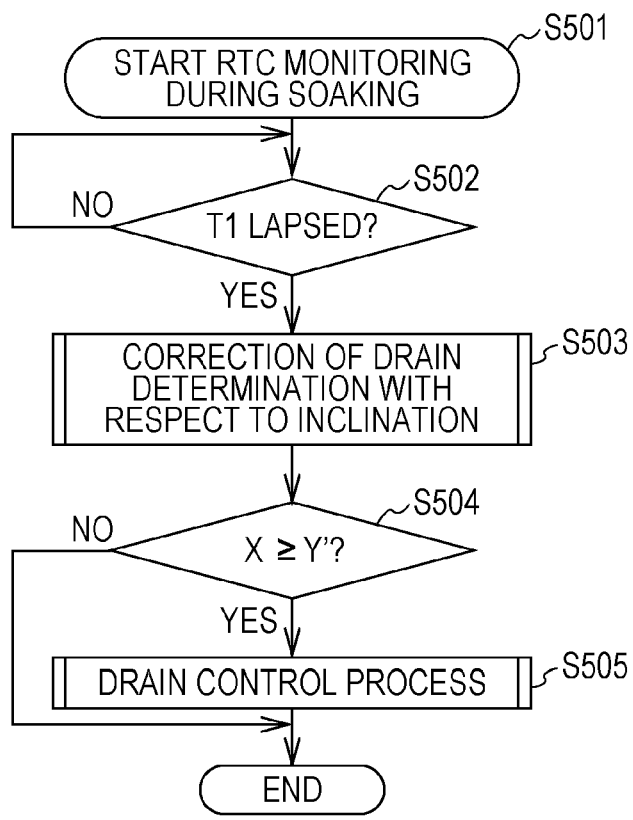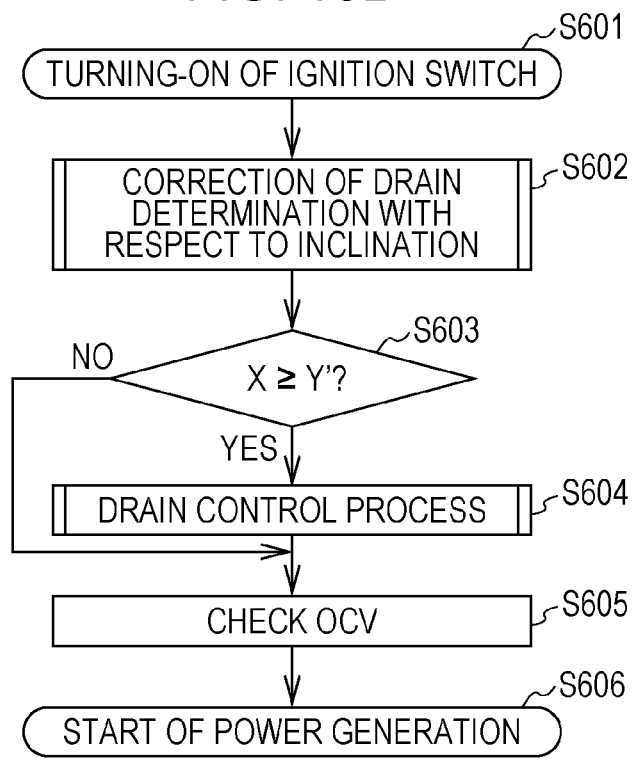

FUEL CELL SYSTEM

CROSS-REFERENCES TO RELATED APPLICATIONS

The present application claims priority under 35 U.S.C. §119 to Japanese Patent Application No. 2010-248658, filed Nov. 5, 2010, entitled "Fuel Cell System". The contents of this application are incorporated herein by reference in it their entirety.

BACKGROUND OF THE INVENTION

1. Field of the Invention

The present invention relates to a fuel cell system.

2. Discussion of the Background

Recently, a fuel cell has been developed which generates electric power by supplying hydrogen (fuel gas) and air (oxidant gas) containing oxygen. The fuel cell is expected as a power source for, e.g., a fuel cell vehicle.

In order to increase the utility factor of hydrogen (fuel gas), the hydrogen discharged from the fuel cell is recycled by using an ejector, for example. However, when moisture (water vapor) discharged from the fuel cell together with the hydrogen is circulated, the fuel cell tends to come into a moisture excessive state. In view of such a situation, a catch tank is disposed in a piping line for circulating anode off-gas to prevent return of the moisture discharged from the fuel cell to the fuel cell again.

Japanese Unexamined Patent Application Publication No. 2007-059221 discloses a technique of detecting a level of water produced and stored in a gas-liquid separator (catch tank), estimating, based on the detected water level, a volume of moisture refluxed from the gas-liquid separator to the fuel cell, and discharging the water produced and stored in the gas-liquid separator when the estimated volume of the refluxed moisture exceeds a predetermined value.

Japanese Unexamined Patent Application Publication No. 2007-123040 discloses a technique of, after turning-off of an ignition switch, removing liquid droplets in an oxidant-gas flow passage and liquid droplets in a fuel-gas flow passage at different timings to suppress the driving of an air compressor, thereby reducing noise.

SUMMARY OF THE INVENTION

According to one aspect of the present invention, a fuel cell system includes a fuel cell, a circulation path, a water reservoir, a water level detector, a water discharger and a controller. The fuel cell generates electric power using fuel gas supplied to an anode and oxidant gas supplied to a cathode. Off-gas discharged from the fuel cell is returned to the fuel cell again through the circulation path. The water reservoir is disposed in the circulation path and stores water separated from the off-gas. The water level detector is configured to detect or estimate a level of the water stored in the water reservoir. The water discharger discharges the water stored in the water reservoir. During monitoring after stop of the fuel cell system or at startup of the fuel cell system, the controller operates the water discharger to discharge the water stored in the water reservoir when the controller determines that the level of the water detected or estimated by the water level detector is equal to or higher than a predetermined reference water level.

According to another aspect of the present invention, a fuel cell system includes a fuel cell, a circulation path, a water reservoir, a water level detector, a water discharger and a controller. The fuel cell generates electric power using fuel gas supplied to an anode and oxidant gas supplied to a cathode. Off-gas discharged from the fuel cell is returned to the fuel cell again through the circulation path. The water reservoir is disposed in the circulation path and stores water separated from the off-gas. The water level detector is configured to detect or estimate a level of the water stored in the water reservoir. The water discharger discharges the water stored in the water reservoir. The controller includes an inclination angle acquiring device configured to acquire an inclination angle of a moving body equipped with the fuel cell system. The controller calculates a reference water amount after correction, which depends on the inclination angle, and a volume of the water stored in the water reservoir, which depends on the inclination angle and the level of the water detected or estimated by the water level detector. During monitoring after stop of the fuel cell system or at startup of the fuel cell system, the controller operates the water discharger to discharge the water stored in the water reservoir when the controller determines that the volume of the water stored in the water reservoir is equal to or larger than the reference water amount after correction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 1 is a block diagram illustrating the configuration of a fuel cell system according to a first embodiment of the present invention.

FIG. 2A illustrates a state where fuel gas is refluxed immediately after the stop of power generation, and FIG. 2B illustrates a state where dew condensation water in the fuel cell is stored in the catch tank during soaking (i.e., in a standing state after the stop of a fuel cell system).

FIG. 3A represents the case where water in the catch tank is discharged during the soaking, and FIG. 3B represents the case where the water in the catch tank is discharged before power generation at startup.

FIG. 5A represents the case where the catch tank is in a horizontal state, and FIG. 5B represents the case where the catch tank is in an inclined state.

FIG. 6A represents the case where the water in the catch tank is discharged during the soaking, and FIG. 6B represents the case where the water in the catch tank is discharged before the power generation at the startup.

FIGS. 10A and 10B are flowcharts illustrating the flow of a process until the water stored in the catch tank is discharged in a fuel cell system according to a third embodiment of the present invention; specifically, FIG. 10A represents the case where the water in the catch tank is discharged during the soaking, and FIG. 10B represents the case where the water in the catch tank is discharged before the power generation at the startup.

DESCRIPTION OF THE EMBODIMENTS

Figure 2A:
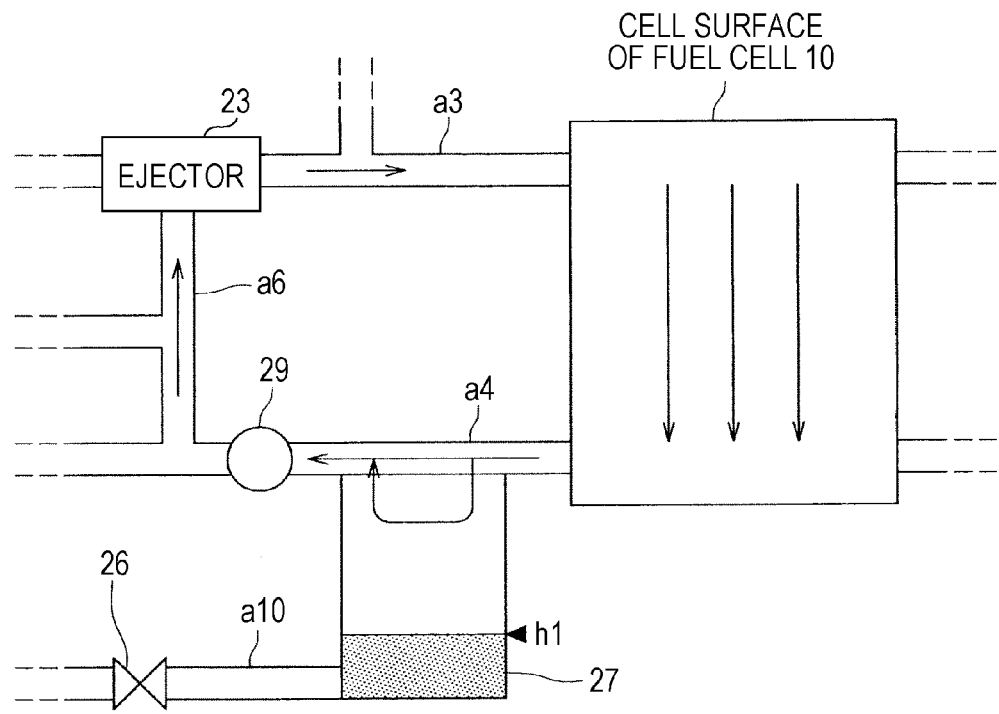
FIGS. 2A and 2B illustrate a fuel cell, a catch tank, an ejector, a drain valve, a hydrogen pump, and piping lines connecting those components in the fuel cell system according to the first embodiment of the present invention; specifically.

According to one preferred embodiment of the present invention, during monitoring after stop of a fuel cell system or at startup thereof, a control unit operates a water discharging unit to discharge water stored in a water reservoir when the control unit determines that a water level detected or estimated by a water level detecting unit disposed in the water reservoir is equal to or higher than a predetermined reference water level.

The above-described feature of the embodiment of the present invention is effective in avoiding such an event that, when the fuel cell system is started up after being stopped, the water stored in the water reservoir is refluxed to the fuel cell along with a gas flow and the fuel cell comes into a moisture excessive state. As a result, stability at startup of the fuel cell system can be ensured.

According to another preferred embodiment of the present invention, the control unit includes an inclination angle acquiring unit, and the control unit executes the determination regarding the water level by comparing a reference water level after correction, which depends on an inclination angle of the water reservoir, with a water level after correction, which depends on the water level detected by the water level detecting unit and the inclination angle.

When a moving body equipped with the fuel cell system is inclined, the water reservoir as a component of the fuel cell system is also inclined. This causes the water stored in the water reservoir to be more apt to reflux to the fuel cell along with the gas flow. Even in such a situation, with the above-described feature of the embodiment of the present invention, the fuel cell can be avoided from coming into the moisture excessive state by obtaining both the reference water level after correction and the water level after correction.

According to still another preferred embodiment of the present invention, the control unit includes an inclination angle acquiring unit, and during monitoring after stop of the fuel cell system or at startup thereof, the control unit operates the water discharging unit to discharge the water stored in the water reservoir when the control unit determines that a volume of the water stored in the water reservoir is equal to or larger than a reference water amount after correction, which depends on an inclination angle of the water reservoir.

With the above-described feature of the embodiment of the present invention, even when the moving body equipped with the fuel cell system is inclined, the fuel cell can be avoided from coming into the moisture excessive state because the amount (volume) of the water stored in the water reservoir is calculated and the calculated water amount is compared with the reference water amount after correction.

Thus, according to the preferred embodiments of the present invention, the fuel cell system ensuring stable operation can be obtained.

The embodiments will now be described with reference to the accompanying drawings, wherein like reference numerals designate corresponding or identical elements throughout the various drawings.

First Embodiment

A first embodiment of the present invention will be described in detail below by referring to the drawings as required. It is to be noted that, in the drawings, common components are denoted by the same reference symbols, and redundant description is not repeated.

<Configuration of Fuel Cell System>

FIG. 1 is a block diagram illustrating the configuration of a fuel cell system 1 according to the first embodiment of the present invention. The fuel cell system 1 is mounted on a fuel cell vehicle (i.e., a moving body; see FIG. 13). The fuel cell system 1 includes a fuel cell 10, an anode system 20, a cathode system 30, a cooling system 40, a control system 50, etc.

<1. Fuel Cell>

The fuel cell 10 is a Polymer Electrolyte Fuel Cell (PEFC). The fuel cell 10 is constituted by stacking a plurality of unit cells (not shown) in each of which a Membrane Electrode Assembly (MEA) (not shown) is held between a pair of electroconductive separators (not shown). The Membrane Electrode Assembly includes, e.g., a Proton Exchange Membrane (PEM) (not shown), an anode (not shown) and a cathode (not shown) which hold the Proton Exchange Membrane therebetween, and a pair of carbon papers (not shown) positioned outside the anode and the cathode and serving as gas diffusion layers.

Further, in the fuel cell 10, a flow passage 10a through which hydrogen (fuel gas) flows is formed in a surface of the separator (not shown), which is positioned to face the carbon paper (not shown) on the anode side, and a flow passage 10b through which air (oxidant gas) flows is formed in a surface of the separator (not shown), which is positioned to face the carbon paper (not shown) on the cathode side. Further, a flow passage 10c through which a coolant (e.g., water containing ethylene glycol) flows is formed in each of the separators for cooling the fuel cell 10. The above-described structure is known in the art, and hence more detailed description is omitted here. It is to be noted that a region near the flow passage 10c in the carbon paper tends to come into a moisture excessive state because of dew condensation, and the moisture excessive state impedes diffusion of gases (hydrogen and air), thus reducing the performance of power generation in the fuel cell 10.

<2. Anode System>

The anode system 20 includes a hydrogen tank 21, an electromagnetically-operated cutoff valve 22, an ejector 23, a purge valve 24, an anode air discharge valve 25, a drain valve 26, a catch tank 27, a dilution box 28, a hydrogen pump 29, piping lines a1 to a11, etc.

The hydrogen tank 21 is connected to the cutoff valve 22 through the piping line a1 and is filled with high-purity hydrogen that is compressed at a high pressure. The cutoff valve 22 is connected to the ejector 23 through the piping line a2. The cutoff valve 22 adjusts supply of the hydrogen from the hydrogen tank 21 through the piping line a1 with its opening and closing.

The ejector 23 is connected to an inlet of the flow passage 10a on the anode side of the fuel cell 10 through the piping line a3. The ejector 23 ejects, from a nozzle (not shown), the hydrogen supplied from the hydrogen tank 21 and generates a negative pressure around the nozzle, thereby sucking unreacted hydrogen that is discharged from an outlet of the flow passage 10a on the anode side.

The catch tank 27 separates and stores moisture (water vapor) contained in off-gas that is discharged from the anode of the fuel cell 10 through the piping line a4.

The purge valve 24 is connected at one end thereof to the piping line a7 branched from the piping line a6 and at the other end thereof to the dilution box 28 through the piping line a8. The purge valve 24 has the function of, with its opening and closing, discharging impurities accumulated in a circulation path (i.e., the piping line a3, the flow passage 10a, and the piping lines a4, a6) to the outside (externally of the vehicle) through the dilution box 28. The term "impurities" imply nitrogen, moisture, etc., that have permeated to the anode side from the cathode side through the Proton Exchange Membrane.

The anode air discharge valve 25 is connected at one end thereof to the piping line a5 and at the other end thereof to the dilution box 28 through the piping line a9. The anode air discharge valve 25 has the function of discharging air, introduced through an anode air inlet valve 33, to the outside (externally of the vehicle) through the dilution box 28 for the purpose of scavenging the anode.

The drain valve 26 is connected at one end thereof to a lower portion of the catch tank 27 through the piping line a10 and at the other end thereof to the dilution box 28 through the piping line a11. The drain valve 26 has the function of, when it is opened, discharging the water stored in the catch tank 27 to the outside (externally of the vehicle) through the dilution box 28.

The dilution box 28 has the function of diluting the impurities incoming through the piping lines a8 and a9 and reducing concentrations of the impurities.

When it is determined after stopping the operation of the fuel cell 10 that moisture purge is required, the hydrogen pump 29 is operated to apply a predetermined pressure to the off-gas in the circulation path (i.e., the piping line a3, the flow passage 10a, and the piping lines a4, a6) such that the water accumulated in the circulation path is purged into the catch tank 27. During the operation, the hydrogen pump 29 is operated to assist the ejector 23. It is to be noted that the hydrogen pump 29 is not an essential component and it may be dispensed with.

<3. Cathode System>

The cathode system 30 includes an air compressor 31, a backpressure control valve 32, an anode air inlet valve 33, piping lines b1 to b4, etc. The air compressor 31 is connected to the piping line b1. The air compressor 31 compresses ambient air and supplies the compressed air to the fuel cell 10.

The backpressure control valve 32 is connected to an outlet of the flow passage 10b on the cathode side of the fuel cell 10 through the piping line b2, and it adjusts a cathode pressure supplied to the cathode of the fuel cell 10.

The anode air inlet valve 33 is connected at one end thereof to the piping line b3 branched from the piping line b1 and at the other end thereof to the piping line a3 through the piping line b4. The anode air inlet valve 33 adjusts an amount of air introduced from the outside with its opening and closing.

<4. Cooling System>

The cooling system 40 includes a radiator 41, a cooling water pump 42, piping lines c1 to c3, etc. The radiator 41 is connected at one end thereof to an outlet of the flow passage 10c through the piping line c1 and at the other end thereof to the cooling water pump 42 through the piping line c2. The radiator 41 has the function of performing heat exchange with respect to ambient air and radiating heat of the fuel cell 10 through the coolant.

The cooling water pump 42 is connected at one end thereof to the radiator 41 through the piping line c2 and at the other end thereof to an inlet of the flow passage 10c through the piping line c3. The cooling water pump 42 has the function of circulating the cooling water in the piping lines c1, c2 and c3 by applying a predetermined pressure thereto.

<5. Control System>

The control system 50 includes a controller 51, an inclination sensor 52, temperature sensors (not shown), etc.

The controller 51 includes a CPU (Central Processing Unit), a RAM (Random Access Memory), a ROM (Read Only Memory) storing programs therein, etc. The controller 51 controls opening and closing of the cutoff valve 22, the purge valve 24, the anode air discharge valve 25, the drain valve 26, and the anode air inlet valve 33. Also, the controller 51 controls rotational speeds of respective motors (not shown) of the air compressor 31 and the cooling water pump 42, an opening degree of the backpressure control valve 32, etc. Moreover, the controller 51 monitors, e.g., respective temperatures of the off-gas flowing through the piping line a5, the off-gas flowing through the piping line b2, and the coolant flowing through the piping line c1, the temperatures being detected by the temperature sensors (not shown).

The controller 51 includes a drain control unit 511, a drain determination correcting unit 512, and an inclination angle acquiring unit 513, which will be described later.

<Regarding Flooding (Moisture Excessive State)>

Figure 2B:
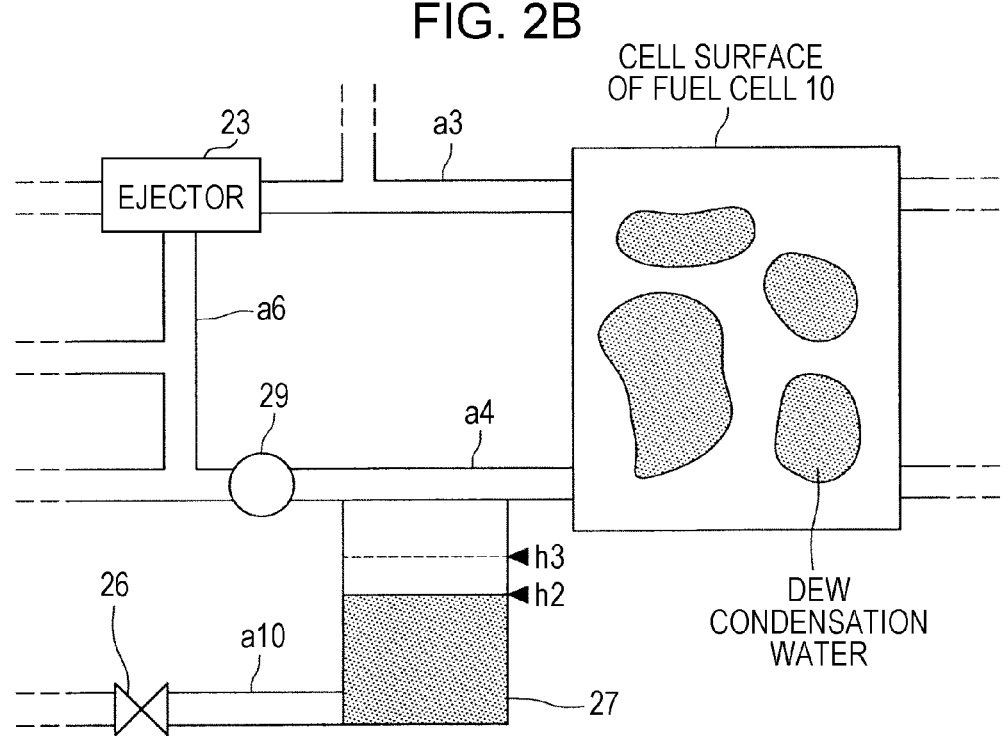

FIGS. 2A and 2B illustrate the fuel cell, the catch tank, the ejector, the drain valve, the hydrogen pump, and the piping lines connecting those components in the fuel cell system according to the first embodiment of the present invention. Specifically, FIG. 2A illustrates a state where the fuel gas is refluxed immediately after the stop of power generation, and FIG. 2B illustrates a state where dew condensation water in the fuel cell is stored in the catch tank during soaking.

In FIG. 2A, until the power generation of the fuel cell 10 is stopped, the fuel gas (hydrogen) is supplied to the flow passage on the anode side through the piping line a3, and the supplied fuel gas reacts with the oxidant gas (oxygen) in the fuel cell 10. The fuel gas after the reaction, the unreacted fuel gas, and impurities (hereinafter collectively referred to as "off-gas") flow through the piping line a4. When the off-gas flows through the piping line a4, moisture contained in the off-gas is separated and stored in the catch tank 27. Here, a level of water stored in the catch tank 27 immediately after the stop of the power generation in the fuel cell 10 is denoted by h1.

However, because the temperature of the fuel cell system 1 lowers during soaking (i.e., in a state where the ignition switch (not shown) is turned off and the fuel cell system 1 is stopped and left to stand), droplets of dew condensation water are generated in large amount in the anode system 20 and the stacked cells (not shown) of the fuel cell 10, which are in a highly humid situation. Further, the droplets of dew condensation water flow into the catch tank 27 through the flow passage on the anode side and the piping line a4.

With an inflow of the water droplets, as illustrated in FIG. 2B, the amount of the water stored in the catch tank 27 increases and the water level rises from h1 immediately after the stop of the power generation to h2 (h2>h1) after the lapse of a predetermined time from the transition to the soaking state. When the water level further rises to h3 (h3>h2), the following phenomenon may occur upon the purging of the OCV (Open Circuit Voltage) when the fuel cell system 1 is started up next time. Namely, the water stored in the catch tank 27 may be transferred to the ejector side along with a gas flow, thus causing flooding (moisture excessive state). In order to ensure the startup stability of the fuel cell system 1, therefore, the water stored in the catch tank 27 needs to be discharged when the level of the water stored in the catch tank 27 reaches a predetermined reference water level.

<Drain (Water Discharge) Control Process>

Figure 3A:
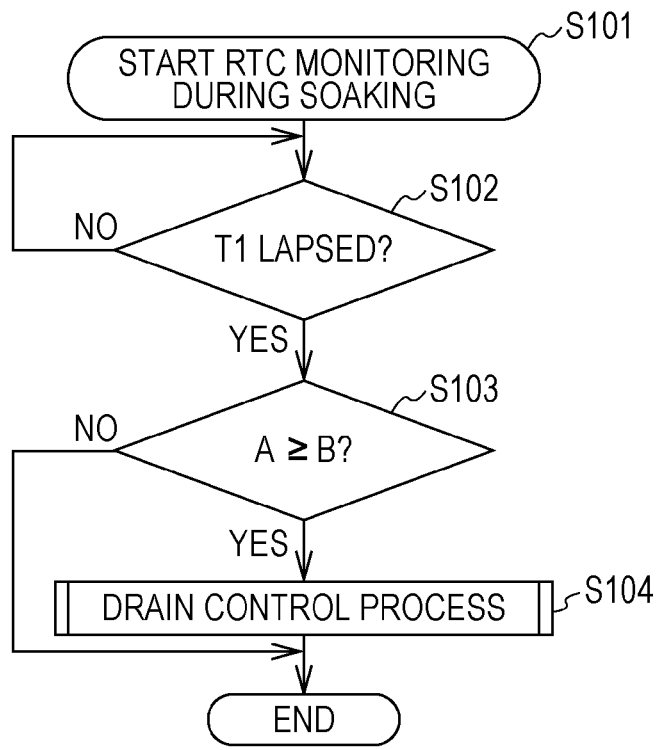
FIGS. 3A and 3B are flowcharts illustrating the flow of a process until the water stored in the catch tank is discharged in the fuel cell system according to the first embodiment of the present invention; specifically.
Figure 3B:
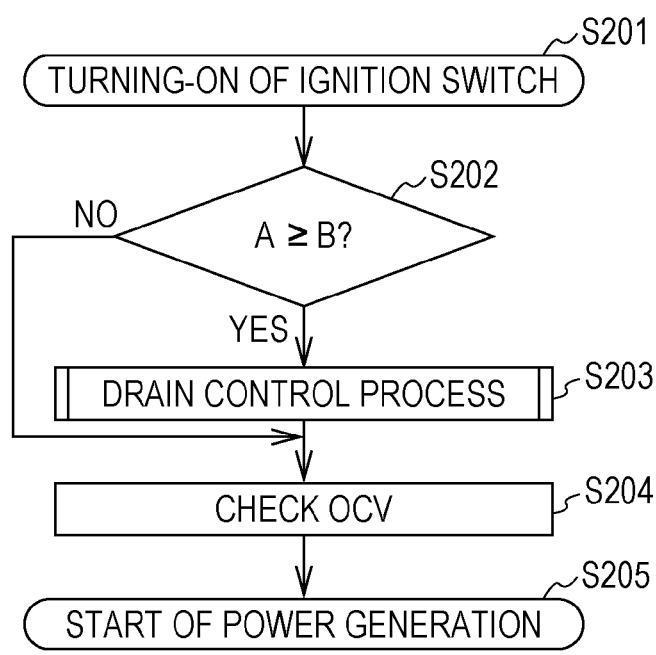

FIGS. 3A and 3B are flowcharts illustrating the flow of a process until the water stored in the catch tank is discharged in the fuel cell system according to the first embodiment of the present invention. Specifically, FIG. 3A represents the case where the water in the catch tank is discharged during the soaking, and FIG. 3B represents the case where the water in the catch tank is discharged before the power generation at the startup.

First, the flow of the drain control process in the case of discharging the water in the catch tank during the soaking will be described with reference to FIG. 3A. In step S101, the RTC (real-time clock) monitoring function, i.e., the system soundness monitoring function, which is included in the controller 51 of the fuel cell system 1, is started during the soaking at predetermined time intervals. In step S102, the controller 51 determines whether a predetermined time T1 has lapsed from the stop of the fuel cell system 1. If it is determined in step S102 that the predetermined time T1 has lapsed from the stop of the fuel cell system 1 ("Yes" in step S102), the controller 51 advances to step S103. If it is determined in step S102 that the predetermined time T1 has not yet lapsed from the stop of the fuel cell system 1 ("No" in step S102), the process returns to step S102.

In step S103, the controller 51 determines whether a level A of the water stored in the catch tank 27 is equal to or higher than a drain reference water level (predetermined reference water level) B that is set to prevent flooding of the fuel cell system 1. Because a predetermined distance L (see FIG. 5A) is previously obtained with a test carried out in the production stage, for example, the drain reference water level B is also known in advance. The predetermined distance L will be described in detail later.

If the water level A is equal to or higher than the drain reference water level B ("Yes" in step S103), the drain control process is executed (step S104), following which the control flow of FIG. 3A is brought to an end. If the water level A is lower than the drain reference water level B ("No" in step S103), the control flow of FIG. 3A is brought to an end without executing the drain control process.

Next, the flow of the drain control process in the case of discharging the water in the catch tank 27 before the power generation at the startup is described with reference to FIG. 3B. In step S201, the ignition switch (not shown) is turned on by a user. In step S202, the controller 51 determines whether the level A of the water stored in the catch tank 27 is equal to or higher than the drain reference water level (predetermined reference water level) B. If the water level A is equal to or higher than the drain reference water level B ("Yes" in step S202), the controller 51 advances to step S203 and executes the drain control process. If the drain control process in step S203 is completed or if the water level A is lower than the drain reference water level B in step S202 ("No" in step S202), the controller 51 advances to step S204. In step S204, the controller 51 checks the OCV and then starts the power generation (step S205).

As an alternative, in the control flow of FIG. 3B, the controller 51 may execute the drain control process in step S203 and the OCV check in step S204 in parallel.

Figure 4:
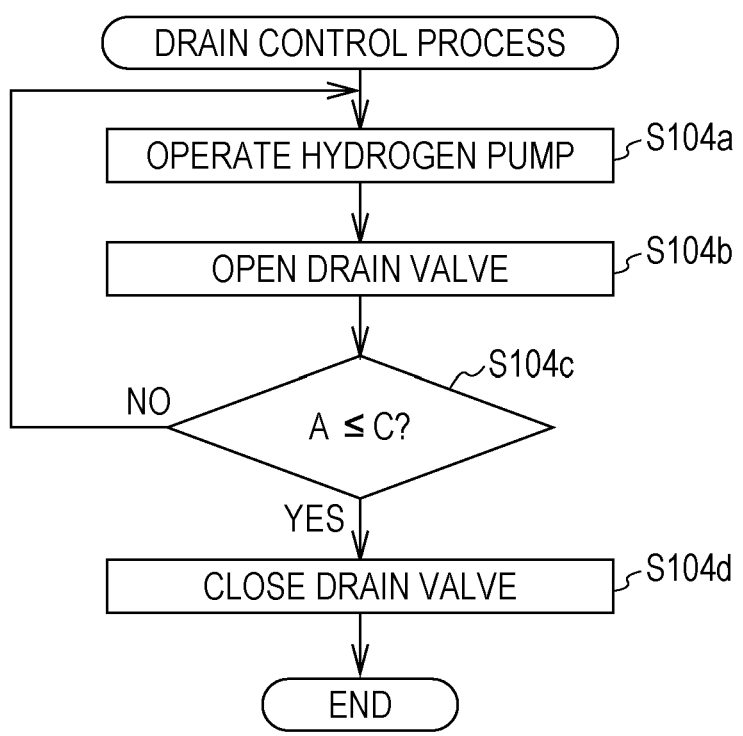
FIG. 4 is a flowchart illustrating the flow of the drain control process in the fuel cell system according to the first embodiment of the present invention.

The drain control process in step S104 of FIG. 3A will be described below. FIG. 4 is a flowchart illustrating the flow of the drain control process in the fuel cell system according to the first embodiment of the present invention.

In step S104a, the drain control unit 511 (see FIG. 1) of the controller 51 operates the hydrogen pump 29 (see FIGS. 2A and 2B) to purge the water, accumulated in the anode circulation path (i.e., the piping line a3, the flow passage 10a, and the piping lines a4, a6: see FIG. 1), into the catch tank 27. The pressure generated at that time causes gases in the circulation path to flow in the sequence of the piping lines a6 and a3, the flow passage 10a, and the piping line a4, thereby purging moisture in the circulation path into the catch tank 27. Next, in step S104b, the drain control unit 511 switches the drain valve 26 (see FIGS. 2A and 2B) from the closed state to the open state, thereby discharging the water stored in the catch tank 27 (see FIGS. 2A and 2B). In step S104c, the drain control unit 511 determines whether the water level A detected by a water level sensor (not shown) installed in the catch tank 27 is equal to or lower than a predetermined value C. If it is determined in step S104c that the water level A is equal to or lower than the predetermined value C ("Yes" in step S104c), the controller 51 switches the drain valve 26 from the open state to the closed state (step S104d) and brings the drain control process to an end. If it is determined in step S104c that the water level A is higher than the predetermined value C ("No" in step S104c), the controller 51 returns to step S104a.

The drain control process in step S203 of FIG. 3B is also executed in a similar manner to that described above.

In step S104a described above, anode scavenging may be performed by driving the air compressor 31 (see FIG. 1) and by switching the anode air inlet valve 33 (see FIG. 1) and the anode air discharge valve 25 (see FIG. 1) from the closed state to the open state.

While, in step S104a described above, the hydrogen pump 29 or the air compressor 31 is operated to produce a gas flow and to purge water into the catch tank 27 with the gas flow, the water may be dropped into the catch tank 27 by gravity instead of producing the gas flow.

Thus, according to the first embodiment, whether the level A of the water stored in the catch tank 27 (see FIGS. 2A and 2B) is equal to or higher than the drain reference water level B is determined during the soaking or before the power generation at the startup of the fuel cell system 1. If the water level A is equal to or higher than the drain reference water level B, the drain valve 26 (see FIGS. 2A and 2B) is switched to the open state, thereby discharging the water stored in the catch tank 27.

It is therefore possible to avoid such an event that water droplets generated during the soaking with dew condensation in the highly-humid anode system 20 are excessively stored in the catch tank 27, and that when the fuel cell system is started up next time, the water stored in the catch tank 27 is transferred up to the fuel cell 10 along with the gas flow, thereby causing the flooding state.

As a result, the first embodiment can ensure stability of the power generation in the fuel cell system 1 and the smooth startup thereof.

Second Embodiment

Figure 5A:
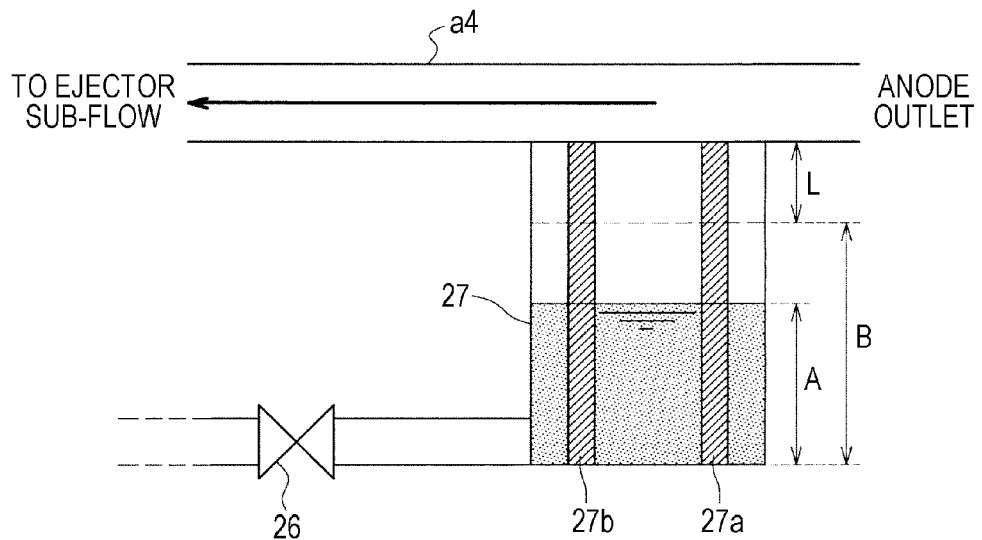
FIGS. 5A and 5B illustrate states of the water stored in the catch tank equipped with a water level sensor; specifically.
Figure 5B:
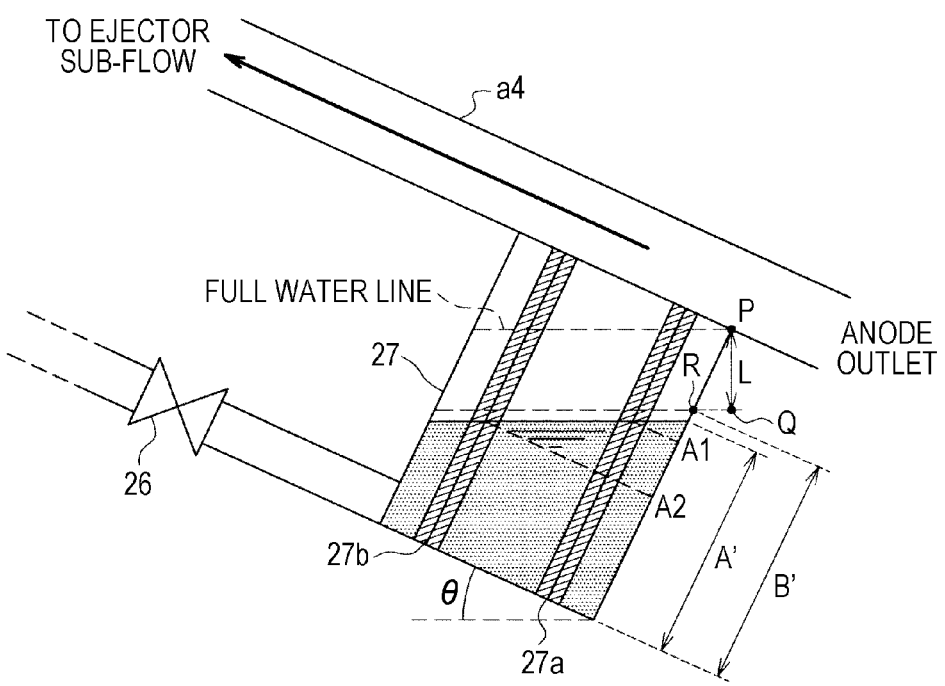

A second embodiment of the present invention will be described below. FIGS. 5A and 5B illustrate states of the water stored in the catch tank equipped with the water level sensor. Specifically, FIG. 5A represents the case where the catch tank is in a horizontal state, and FIG. 5A represents the case where the catch tank is in an inclined state.

The anode off-gas discharged from the anode outlet flows through the piping line a4 in the direction denoted by an arrow. A water level sensor 27a or 27b is installed in the catch tank 27. In practice, one of the water level sensors 27a and 27b is installed in the catch tank 27, but FIGS. 5A and 5B illustrate both the water level sensors 27a and 27b for convenience of explanation.

When a vehicle 100 (see FIG. 13) is running or stopped on a horizontal road surface, the catch tank 27 is also in the horizontal state as illustrated in FIG. 5A. In FIG. 5A, A represents the level of the water stored in the catch tank 27, and B represents the drain reference water level adapted for preventing flooding of the fuel cell system 1 when the catch tank 27 is in the horizontal state (B being referred to simply as the "drain reference water level" hereinafter).

When the vehicle 100 (see FIG. 13) is inclined by an angle θ in a posture with the water level sensor 27a positioned on the downward side, the catch tank 27 comes into the inclined state of FIG. 5B from the horizontal state of FIG. 5A. In the inclined state of FIG. 5B, the catch tank 27 is inclined by the angle θ in a posture with the water level sensor 27a positioned on the downward side, while the surface of the water stored in the catch tank 27 remains substantially horizontal. It is here supposed that the inclination angle of the vehicle 100 and the inclination angle of the catch tank 27 are the same.

A condition of causing the water in the catch tank 27 to flow into the ejector sub-flow side depends on a distance from a point P at an upper corner of the catch tank 27 to a plane including the water surface in the vertical direction. Accordingly, when the catch tank 27 is inclined as illustrated in FIG. 5B, a point representing a drain reference water level B' is given by a point R where a horizontal plane including a point Q, which is spaced downward in the vertical direction by the predetermined distance L from the point P at the upper corner of the catch tank 27, intersects the downward side of the catch tank 27 in the inclined state. The predetermined distance L is constant regardless of change in the inclination angle of the catch tank 27, and a value of the predetermined distance L is previously obtained with a test carried in the production stage, for example.

Additionally, in FIG. 5B, A' represents a water level at a position where the surface of the water stored in the catch tank 27 contacts with the downward side of the catch tank 27 in the inclined state. Also, A1 represents a water level detected by the water level sensor 27a, and A2 represents a water level detected by the water level sensor 27b.

When the catch tank 27 is inclined, the water level A' (i.e., the water level after correction) rises in comparison with the water level A when the catch tank 27 is in the horizontal state. Furthermore, although the predetermined distance L is not changed, the drain reference water level B' (i.e., the drain reference water level after correction) lowers in comparison with the drain reference water level B when the catch tank 27 is in the horizontal state. In other words, as the inclination angle θ of the catch tank 27 increases, the water level A' approaches the drain reference water level B'. When the water level A' reaches the drain reference water level B', this leads to a possibility that the flooding may occur in the fuel cell system 1.

Accordingly, when the catch tank 27 is inclined by the angle θ, it is required to estimate the water level A' after correction and the drain reference water level B' after correction and to compare the water level A' after correction with the drain reference water level B' after correction.

A method of deriving or confirming the angle θ will be described later.

Figure 6A:
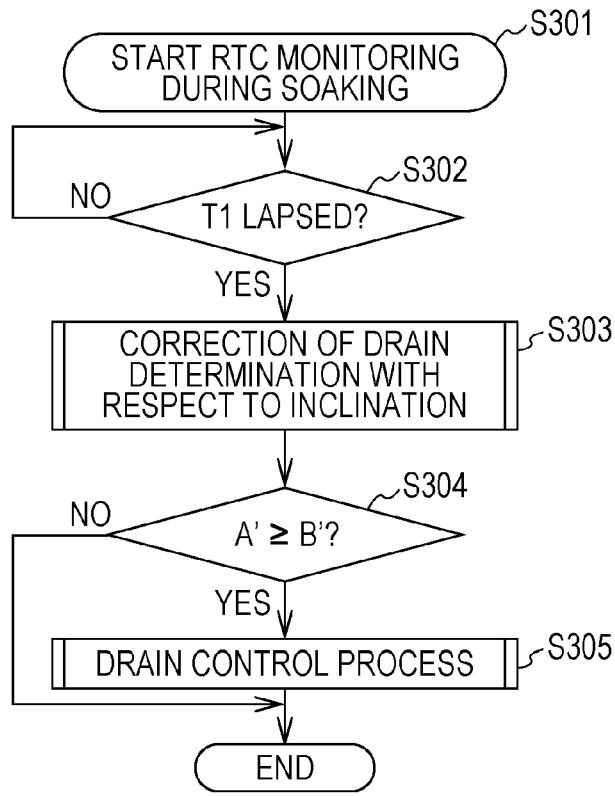
FIGS. 6A and 6B are flowcharts illustrating the flow of a process until the water stored in the catch tank is discharged in a fuel cell system according to a second embodiment of the present invention; specifically.
Figure 6B:
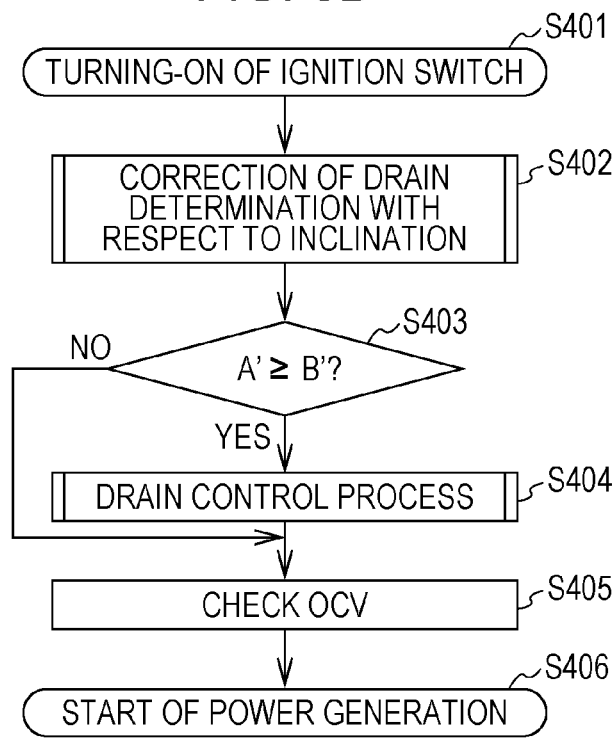

FIGS. 6A and 6B are flowcharts illustrating the flow of a process until the water stored in the catch tank is discharged in a fuel cell system according to a second embodiment of the present invention. Specifically, FIG. 6A represents the case where the water in the catch tank is discharged during the soaking, and FIG. 6B represents the case where the water in the catch tank is discharged before the power generation at the startup.

The second embodiment is similar to the first embodiment except that, in the second embodiment, a process of correcting drain determination with respect to an inclination is added to the control flows described above with reference to FIGS. 3A and 3B, and that a subsequent comparison process is executed based on the result of the correction process. Hence, only different points in the second embodiment are described below and duplicate description of similar points to those in the first embodiment is omitted here.

In FIG. 6A, if a predetermined time T1 has lapsed from the stop of the fuel cell system 1 ("Yes" in step S302), the controller 51 (see FIG. 1) advances to step S303. In step S303, the drain determination correcting unit 512 (see FIG. 1) of the controller 51 executes the process of correcting the drain determination with respect to the inclination.

Figure 7:
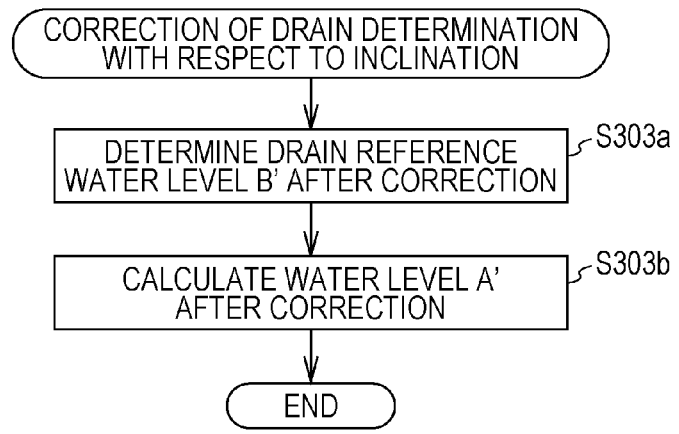
FIG. 7 is a flowchart illustrating the flow of a process of correcting drain determination with respect to an inclination in the fuel cell system according to the second embodiment of the present invention.

FIG. 7 is a flowchart illustrating the flow of a process (step S303) of correcting the drain determination with respect to the inclination. In step S303a, the drain determination correcting unit 512 (see FIG. 1) determines the drain reference water level B' after correction. Because the mounted position of the water level sensor 27a or 27b (see FIG. 5A) and the predetermined distance L (see FIG. 5B) are known in advance, a value of the drain reference water level B' after correction is determined depending on the inclination angle θ (see FIG. 5B) of the catch tank 27.

In step S303b, the drain determination correcting unit 512 calculates the water level A' after correction. Because the mounted position of the water level sensor 27a or 27b is known in advance, the water level A' after correction can be calculated from a water level A1 or A2 detected by the water level sensor 27a or 27b and a value of the inclination angle θ.

Returning to FIG. 6A again, the controller 51 determines in step S304 whether the water level A' after correction is equal to or higher than the drain reference water level B' after correction. If the water level A' after correction is equal to or higher than the drain reference water level B' after correction ("Yes" in step S304), the drain control unit 511 (see FIG. 1) executes the drain control process in step S305. The drain control process can be executed in a similar manner to that described above with reference to FIG. 4, and hence the detailed description of the drain control process is omitted here.

Thus, the drain determination correcting process is executed by correcting the water level A1 or A2 to the water level A' after correction (A'≧A1 or A2), correcting the drain reference water level B in the horizontal state to the drain reference water level B' after correction (B'≦B), and by comparing the water level A' after correction with the drain reference water level B' after correction.

Figure 8:
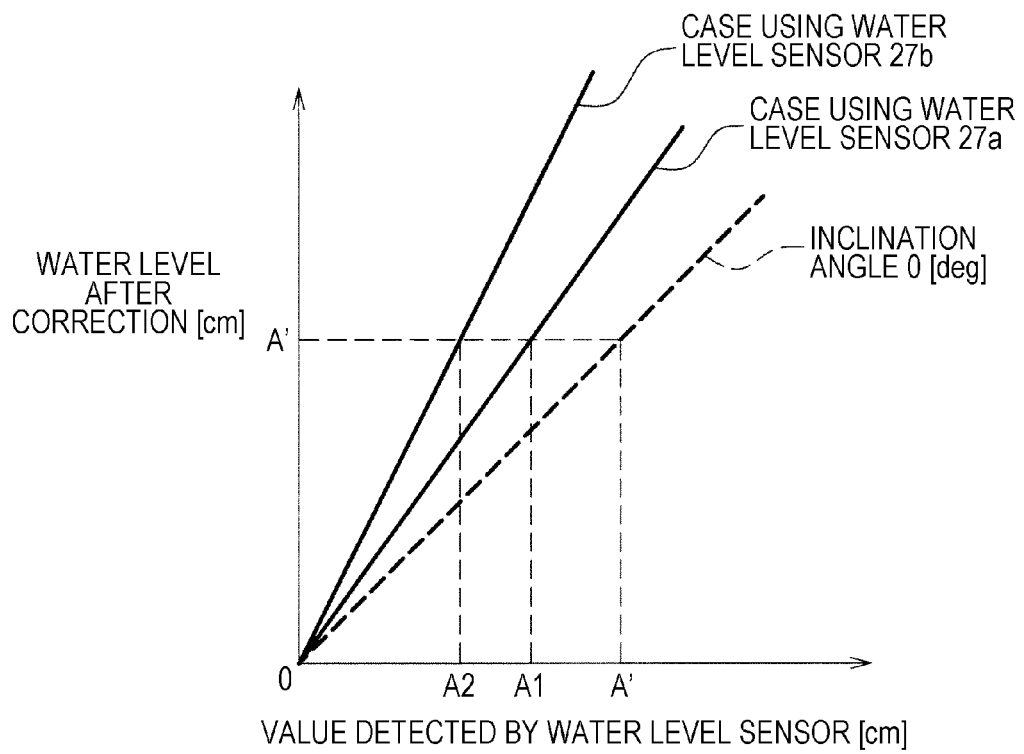
FIG. 8 is a graph illustrating the relationship between a value detected by the water level sensor in the catch tank and a water level after correction.

FIG. 8 is a graph illustrating the relationship between a value detected by the water level sensor in the catch tank and a water level after correction. Let now consider, for example, the case where one water level sensor is installed as the water level sensor 27a (see FIG. 5B). When the catch tank 27 is inclined by the angle θ in a posture with the water level sensor 27a positioned on the downward side and the water level detected by the water level sensor 27a is A1 (see FIGS. 5B and 8), a value of the water level A' after correction is larger than that of the detected water level A1. Such a tendency is more significant as the inclination angle θ increases.

Figure 9:
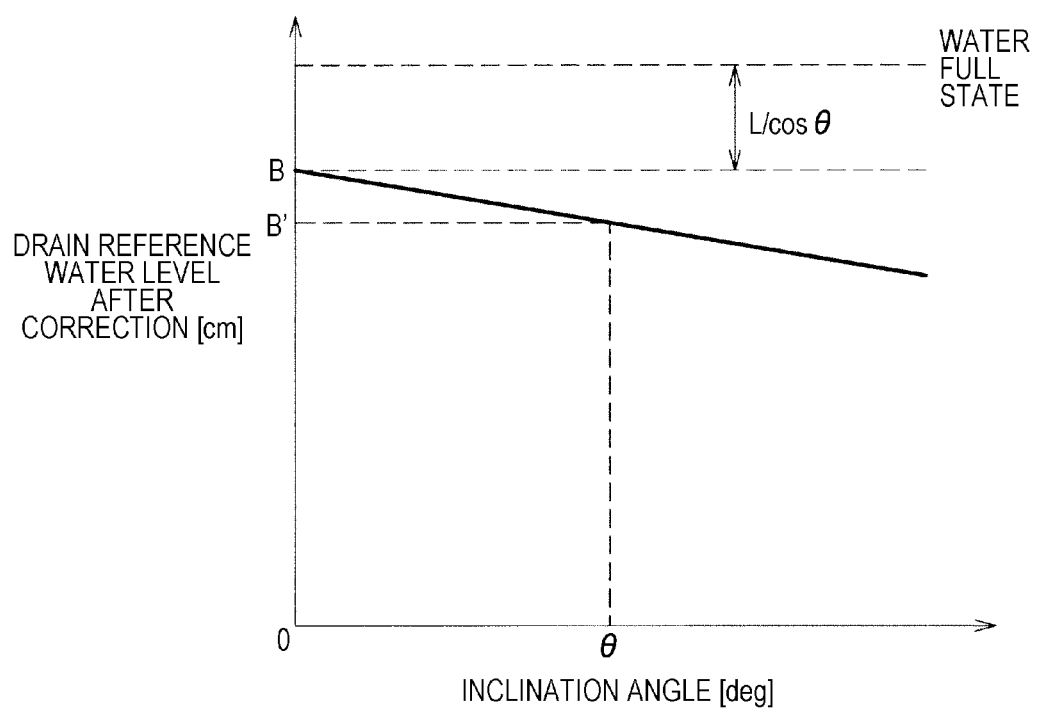
FIG. 9 is a graph illustrating the relationship between an inclination angle of the catch tank and a drain reference water level after correction.

FIG. 9 is a graph illustrating the relationship between the inclination angle of the catch tank and the drain reference water level after correction. As the inclination angle θ of the catch tank 27 increases, a value of the drain reference water level B' after correction reduces.

The case of discharging the water in the catch tank 27 before the power generation at the startup will be described below. The flowchart of FIG. 6B is similar to the flowchart of FIG. 3B except that the process of correcting the drain determination with respect to the inclination is added as step S402, and that a comparison process in step S403 is executed by using different parameters from those used in FIG. 3B. The drain determination correcting process in step S402 and the comparison process in step S403 are similar to those in step S303 and step S304 described above with reference to FIG. 6A. Hence, description of steps S402 and S403 is omitted here.

In this second embodiment, the drain reference water level B is corrected to the drain reference water level B' after correction, and the water level A1 or A2 detected by the water level sensor 27a or 27b is corrected to the water level A' after correction. With those corrections, it is possible to avoid such an event that, when the catch tank 27 is inclined, flooding may occur with a water amount at which the flooding is not caused when the catch tank 27 is in the horizontal state.

Accordingly, even when the vehicle 100 (see FIG. 13) is stopped on the inclined road surface, the flooding can be avoided at the next startup by executing the above-described drain determination correcting process, whereby the power generation in the fuel cell system 1 can be stabilized and the smooth startup thereof can be ensured.

Third Embodiment

The correction of the drain determination is executed in the second embodiment by comparing the water level in the catch tank with the drain reference water level in the state where the catch tank 27 is inclined. In contrast, the correction of the drain determination is executed in the third embodiment by comparing a water amount in the catch tank with a drain reference water amount.

FIGS. 10A and 10B are flowcharts illustrating the flow of a process until the water stored in the catch tank is discharged in a fuel cell system according to the third embodiment of the present invention. Specifically, FIG. 10A represents the case where the water in the catch tank is discharged during the soaking, and FIG. 10B represents the case where the water in the catch tank is discharged before the power generation at the startup.

The flowcharts of FIGS. 10A and 10B are similar to those of FIGS. 6A and 6B described above in the second embodiment except for a process of correcting the drain determination with respect to the inclination (i.e., step S503 of FIG. 10A and step S602 of FIG. 10B) and a subsequent comparison process (i.e., step S504 of FIG. 10A and step S603 of FIG. 10B). Hence, the duplicate description of similar steps to those in FIGS. 6A and 6B is omitted here.

A method of deriving or confirming the angle θ will be described later.

Figure 11:
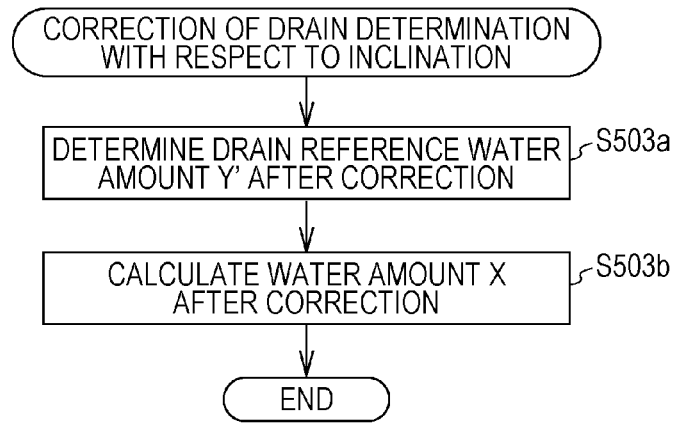
FIG. 11 is a flowchart illustrating the flow of a process of correcting drain determination with respect to an inclination in the fuel cell system according to the third embodiment of the present invention.

The process of correcting the drain determination with respect to the inclination in step S503 of FIG. 10A will be described below. FIG. 11 is a flowchart illustrating the flow of the process of correcting the drain determination with respect to the inclination in the fuel cell system according to the third embodiment of the present invention.

In step S503a of FIG. 11, the drain determination correcting unit 512 (see FIG. 1) determines a drain reference water amount after correction. It is here assumed that Y denotes a drain reference water amount when the catch tank 27 is in the horizontal state (see FIG. 5A), and that Y' denotes a drain reference water amount when the catch tank 27 is in the inclined state (see FIG. 5B) (i.e., the drain reference water amount after correction). The drain reference water amount Y' after correction represents a water amount at which the surface of the water stored in the catch tank 27 corresponds to the drain reference water level B' after correction in FIG. 5B.

Because the shape of the catch tank 27, the predetermined distance L (see FIG. 5B), and the mounted position of the water level sensor 27a or 27b are known in advance, a value of the drain reference water amount Y' after correction is determined depending on the inclination angle θ of the catch tank 27.

In step S503b, the drain determination correcting unit 512 (see FIG. 1) calculates the amount (volume) of the water stored in the catch tank 27. Because the amount (volume) of the water currently stored in the catch tank 27 is not changed depending on the inclination angle θ of the catch tank 27 unless water is supplied through an external piping line, a parameter to be corrected is just the drain reference water amount.

Further, because the shape of the catch tank 27 and the mounted position of the water level sensor are known in advance, the amount (volume) of the water stored in the catch tank 27 can be calculated from the water level A1 or A2 detected by the water level sensor 27a or 27b and the inclination angle θ.

After executing the drain determination correcting process in step S503 of FIG. 10A, the controller 51 determines in step S504 whether a catch-tank water amount X is equal to or larger than the drain reference water amount Y' after correction. If the catch-tank water amount X is equal to or larger than the drain reference water amount Y' after correction ("Yes" in step S504), the drain control unit 511 executes the drain control process (step S505).

Figure 12:
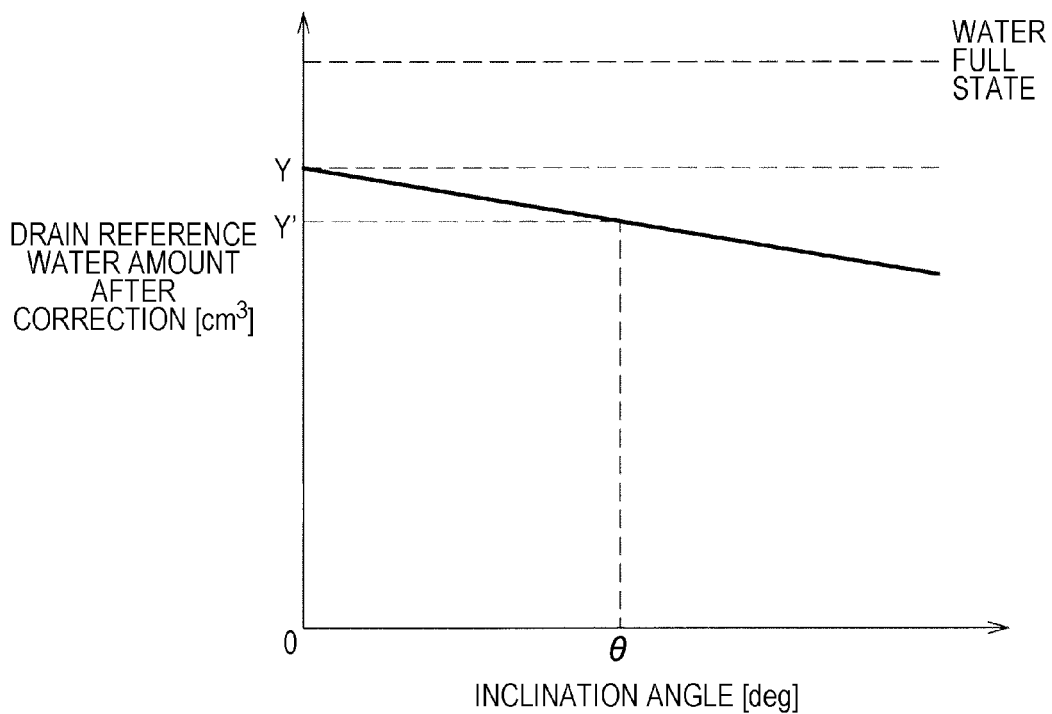
FIG. 12 is a graph illustrating the relationship between an inclination angle of the catch tank and a drain reference water amount after correction.

FIG. 12 is a graph illustrating the relationship between the inclination angle of the catch tank and the drain reference water amount after correction.

As seen from FIG. 12, as the inclination angle θ of the catch tank 27 increases, a value of the drain reference water amount Y' after correction reduces.

Next, the case of discharging the water in the catch tank before the power generation at the startup is described. After the ignition switch (not shown) has been turned on in step S601 of FIG. 10B, the drain determination correcting unit 512 (see FIG. 1) executes the process of correcting the drain determination with respect to the inclination (step S602). The drain determination correcting process is executed in a similar manner to that described above with reference FIG. 11. In step S603, the controller 51 (see FIG. 1) determines whether the catch-tank water amount X is equal to or larger than the drain reference water amount Y' after correction. If the catch-tank water amount X is equal to or larger than the drain reference water amount Y' after correction ("Yes" in step S603), the drain control unit 511 (see FIG. 1) executes the drain control process in step S604.

With this third embodiment, by correcting the drain reference water amount as described above, it is possible to avoid such an event that, when the catch tank 27 is inclined, flooding may occur with the water amount at which the flooding is not caused when the catch tank 27 is in the horizontal state.

Accordingly, even when the vehicle 100 (see FIG. 13) is stopped on the inclined road surface, the flooding can be avoided at the next startup by executing the above-described drain determination correcting process, whereby the power generation in the fuel cell system 1 can be stabilized and the smooth startup thereof can be ensured.

<<Method for Deriving Inclination Angle θ>>

Figure 13:
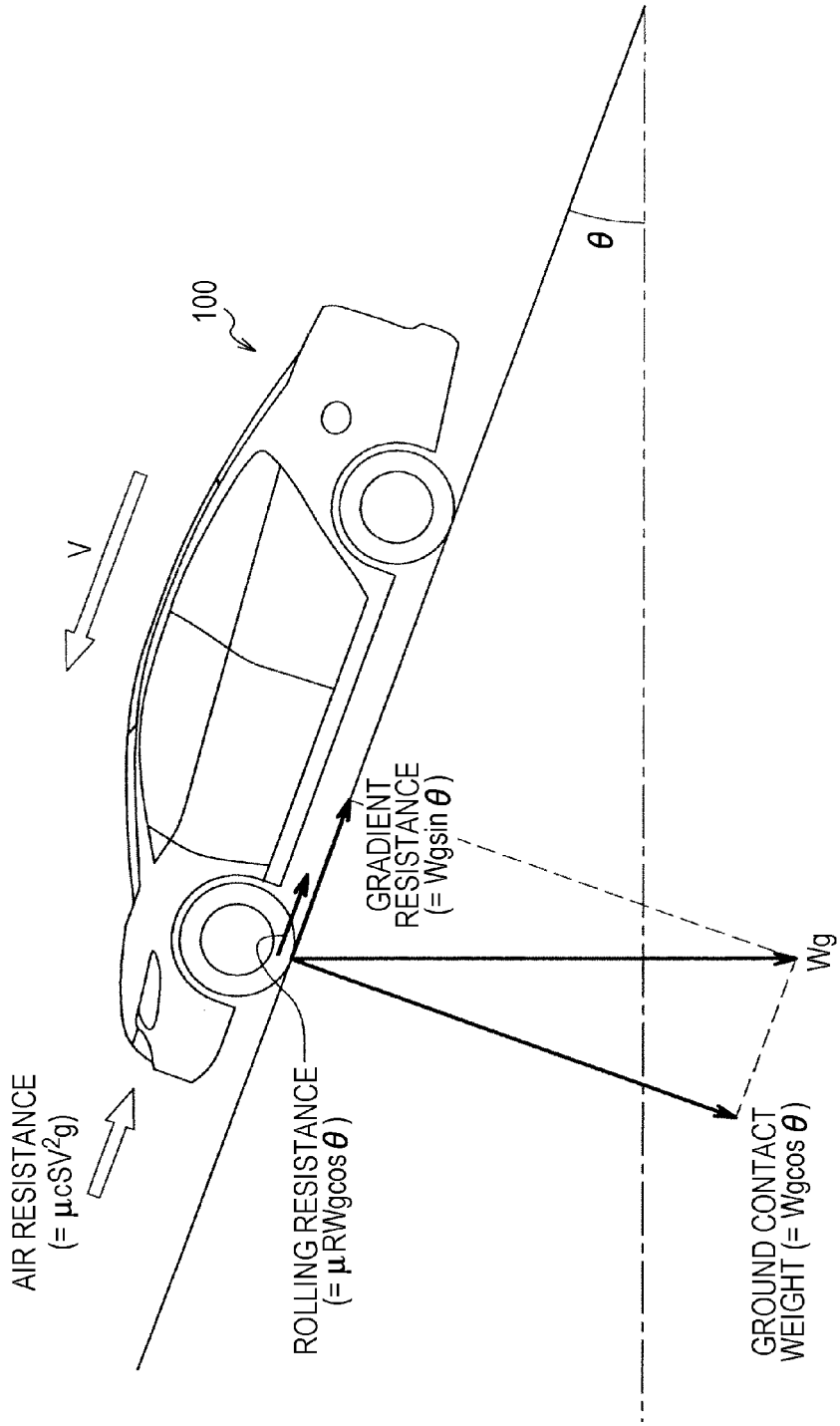
FIG. 13 illustrates, in terms of vectors, a speed, an air resistance, a rolling resistance, a gradient resistance, a ground contact weight, and a total vehicle weight when a moving body is running over an inclined road surface.

While the inclination angle θ can be derived by using various methods, a method of deriving the inclination angle θ by primarily employing a running resistance, etc. of a moving body will be described below. FIG. 13 illustrates, in terms of vectors, a speed, an air resistance, a rolling resistance, a gradient resistance, a ground contact weight, and a total vehicle weight when a moving body is running over an inclined road surface.

Let now consider the case where the vehicle (moving body) 100 runs at a speed V over a road surface that is inclined by the angle θ from a horizontal plane. A running resistance D of the vehicle 100 running over the inclined road surface at the speed V is determined in order to derive the inclination angle θ. Given that the air resistance is A, the rolling resistance is F, and the gradient resistance is G, the running resistance D is expressed by the following formula (1):

$$D = A + F + G \qquad (1)$$

The air resistance A, the rolling resistance F, and the gradient resistance G are expressed by the following formulae (2) to (4) in which μc is an air resistance coefficient, S is a front projected area of the vehicle 100, μR is a rolling resistance coefficient, W is a total vehicle weight, and g is the gravitational acceleration.

$$A = \mu c S V^2 g \qquad (2)$$

$$F = \mu R W g \cdot \cos \theta \qquad (3)$$

$$G = W g \cdot \sin \theta \qquad (4)$$

In the above formulae, the parameters other than cos θ and sin θ are known values.

Meanwhile, the running resistance D can also be expressed by the following formula (5) in which J is a driving force and K is an excess driving force:

$$D = J - K \qquad (5)$$

The driving force J (specifically, J1 during driving and J2 during regeneration) and the excess driving force K are expressed by the following formulae (6) to (8) in which M is a torque of a motor shaft, N is a gear ratio, α is efficiency of a transmission, R is a tire radius of the vehicle 100, a is an acceleration of the vehicle 100, W is a total vehicle weight, and I is an inertial weight (rotational inertia):

$$J1 = MN\alpha/R \qquad (6)$$

$$J2 = MN/(\alpha R) \qquad (7)$$

$$K = a(W + I) \qquad (8)$$

Values of the above parameters (i.e., the motor shaft torque M, the gear ratio N, the transmission efficiency α, the tire radius R, the acceleration a, the total vehicle weight W, and the rotational inertia I) can be all obtained through calculations, etc. Therefore, the driving force J (J1 or J2) and the excess driving force K can also be calculated from the formulae (6) to (8).

By eliminating the running resistance D from the formulae (1) and (5), the following formula (9) is obtained:

$$A + F + G = J - K \qquad (9)$$

By substituting the formulae (2), (3) and (4) into the formula (9), the following formula (10) is obtained:

$$\mu c S V^2 g + \mu R W g \cdot \cos \theta + W g \cdot \sin \theta = J - K \qquad (10)$$

Further, the above formula (10) can be rewritten into:

$$\mu R \cos \theta + \sin \theta = \{(J-K)/g - \mu c S V^2\}/W \qquad (11)$$

Here, since a value of μR cos θ is sufficiently smaller than that of sin θ, the above formula (11) is approximated by:

$$\sin \theta = \{(J-K)/g - \mu c S V^2\}/W \qquad (12)$$

Thus, the inclination angle θ is expressed by:

$$\theta = \sin^{-1}[\{(J-K)/g - \mu c S V^2\}/W] \qquad (13)$$

The process of deriving the inclination angle θ is executed by the inclination angle acquiring unit 513 (see FIG. 1) of the controller 51 (see FIG. 1). The inclination angle θ is calculated continuously or periodically while the vehicle 100 is running. When the vehicle 100 is stopped, the above-described drain determination correcting process in the second embodiment or the third embodiment is executed by using a value of the inclination angle θ of the vehicle 100 immediately before the stop of the vehicle.

As an alternative, the inclination angle θ can be estimated from, e.g., a value detected by the inclination sensor 52 (see FIG. 1) or GPS information. However, the provision of the inclination sensor 52, etc. increases the production cost of the vehicle 100. By employing the above-described method, the inclination angle θ can be derived if the speed and the motor torque of the vehicle 100 are obtained in addition to the total vehicle weight W and the other parameter values. Accordingly, the production cost of the vehicle 100 can be reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell system comprising:
   a fuel cell configured to generate electric power using fuel gas supplied to an anode and oxidant gas supplied to a cathode;
   a circulation path through which off-gas discharged from the fuel cell is returned to the fuel cell again;
   a water reservoir that is disposed in the circulation path and that is configured to store water separated from the off-gas;
   a water level detector configured to detect or estimate a level of the water stored in the water reservoir;
   a water discharger configured to discharge the water stored in the water reservoir; and
   a controller programmed to monitor the fuel cell system using an output of the water level detector in a state where the fuel cell system is left to stand after the fuel cell is stopped,
   wherein the controller is programmed to operate the water discharger, during monitoring after stop of the fuel cell to discharge the water stored in the water reservoir when the controller determines that the level of the water detected or estimated by the water level detector is equal to or higher than a predetermined reference water level.

2. The fuel cell system according to claim 1, wherein the controller includes an inclination angle acquiring device configured to acquire an inclination angle of a moving body equipped with the fuel cell system, and wherein the controller is configured to execute a determination regarding the water level by comparing a reference water level after correction, which depends on the inclination angle, with a water level after correction, which depends on the inclination angle and the level of the water detected or estimated by the water level detector.

3. The fuel cell system according to claim 2, wherein the inclination angle acquiring device is configured to derive the inclination angle based on a running resistance.

4. A fuel cell system comprising:
a fuel cell configured to generate electric power using fuel gas supplied to an anode and oxidant gas supplied to a cathode;
a circulation path through which off-gas discharged from the fuel cell is returned to the fuel cell again;
a water reservoir that is disposed in the circulation path and that is configured to store water separated from the off-gas;
a water level detector configured to detect or estimate a level of the water stored in the water reservoir;
a water discharger configured to discharge the water stored in the water reservoir; and
a controller including an inclination angle acquiring device programmed to acquire an inclination angle of a moving body equipped with the fuel cell system, the controller being programmed to monitor the fuel cell system using an output of the water level detector in a state where the fuel cell system is left to stand after the fuel cell is stopped, wherein the controller is programmed to calculate a reference water amount after correction, which depends on the inclination angle, and a volume of the water stored in the water reservoir, which depends on the inclination angle and the level of the water detected or estimated by the water level detector, and wherein the controller is programmed to operate the water discharger, during monitoring after stop of the fuel cell to discharge the water stored in the water reservoir when the controller determines that the volume of the water stored in the water reservoir is equal to or larger than the reference water amount after correction.

5. The fuel cell system according to claim 4, wherein the inclination angle acquiring device is configured to derive the inclination angle based on a running resistance.

* * * * *